United States Patent [19]
Winter

[11] 3,803,926
[45] Apr. 16, 1974

[54] TURNBUCKLE DRIVE

[76] Inventor: Augustus P. Winter, 8373 Cliffridge Ln., La Jolla, Calif. 92037

[22] Filed: July 24, 1972

[21] Appl. No.: 274,677

[52] U.S. Cl............... 74/89.15, 74/424.8 B, 287/60
[51] Int. Cl............................................ F16h 27/02
[58] Field of Search.. 287/60, 61; 74/89.15, 424.8 B

[56] References Cited
UNITED STATES PATENTS

| | | | |
|---|---|---|---|
| 2,885,234 | 5/1959 | Larson | 287/60 |
| 3,065,007 | 11/1962 | Colmer, Jr. | 287/60 |
| 3,159,046 | 12/1964 | Harned et al. | 74/424.8 B |
| 2,367,740 | 1/1945 | Schubert | 287/60 |
| 2,810,595 | 10/1957 | Purdy | 287/60 |
| 310,767 | 1/1885 | Wilson | 287/60 |

FOREIGN PATENTS OR APPLICATIONS

| | | | |
|---|---|---|---|
| 857,203 | 12/1960 | Great Britain | 74/424.8 B |
| 13,555 | 6/1881 | Germany | 74/424.8 B |

Primary Examiner—Benjamin W. Wyche
Assistant Examiner—Wesley S. Ratliff, Jr.
Attorney, Agent, or Firm—Christie, Parker & Hale

[57] ABSTRACT

A first and second axially aligned pair of recirculating ball nuts and screws have the screws of both pairs joined for axial movement together. Both recirculating ball nuts are driven in rotation by a source of rotary power and both nuts are axially constrained with respect to their screws. The screws are oppositely threaded to produce linear reciprocation from unidirectional rotary power. Each screw is braked to prevent its rotation with respect to its associated ball nut at the beginning of and throughout its power stroke, while the other screw is left free to rotate with its recirculating ball nut. At the end of a power stroke the brake is released to allow the first screw to rotate with its ball nut while at the same time the second screw is braked to initiate its power stroke.

10 Claims, 7 Drawing Figures

TURNBUCKLE DRIVE

BACKGROUND OF THE INVENTION

The present invention relates to drives in general and, more specifically, to an improved reciprocating drive.

A reciprocating drive, as its name tells us, is capable of going back and forth with translational motion between two spaced-apart limits. Reciprocating drives have a multitude of uses. For example, reciprocating drives are used in pumps and compressors to pump fluids or compress gases to high pressures. Another example of use of reciprocating drives is in steering a vehicle or the rudder of a boat. Obviously, in the latter applications the frequent periodicity associated with such applications as a compressor is absent.

A reciprocating drive should perform its reciprocating function as efficiently as possible. That is, it should convert as much of its power input to power output as is possible. Obviously, the greater the flexibility of a given reciprocating drive to varied applications, the more desirable it is. Simplicity in construction and economy in operation are also important.

SUMMARY OF THE INVENTION

The present invention provides an improved reciprocating drive which is flexible in that it can be adapted for a number of uses, which is efficient in converting its motive power into its own output power, and which is extremely simple and economical to produce and operate.

Reciprocation is accomplished in true linear fashion in contrast to reciprocating motion achieved with the common crank-throw which produces an eccentric rather than linear reciprocation.

The principle of the present invention can be readily understood with the help of a common turnbuckle. A common turnbuckle has axially aligned, oppositely threaded screws in a rectangular frame. If the frame is rotated at a constant speed and constantly in the same direction both screws will rotate with it. If the rotation of one of the screws is stopped, it will move relative to the frame. By externally connecting the screws together, if the rotation of one is stopped, both move linearly with respect to the frame. Alternately stopping the screws at the right time produces reciprocation.

The broadest form of the present invention contemplates a reciprocal drive having a rotary drive, such as an electric motor. First and second drive members are coupled to the rotary drive for rotation by the drive. The first and second drive members may be, for example, recirculating ball nuts or linear ball bushings having their parallel rollers or ball circuits oriented in a spiral to give a screw pitch effect. First and second driven members are coupled to the first and second drive members, respectively, for rotation together and for translation of the driven member with respect to the drive member when there is relative rotation between the two. The driven member may be a screw when the drive member is a recirculating ball nut. When the drive member is a linear ball or roller bushing with its ball or roller circuits oriented in a spiral, the driven member may be an unthreaded shaft. Means is provided for preventing translation of the drive members with respect to the driven members. Means is also provided for coupling the driven members together for translation together while permitting rotation of the driven members with respect to each other. Means, such as selectively activatable brakes, for each of the driven members produce relative rotation between the drive and driven members of each pair of drive and driven members to produce translation of the driven members.

One general form of the present invention contemplates the use of a source of rotary power to drive pairs of nut and screw combinations in rotation. Low friction means is provided between the threads of each nut and screw, such as providing each nut and screw of the recirculating ball type. Brake means are provided to effect relative motion between each nut and its associated screw at alternate portions of a cycle to produce linear movement of one of them. The member of the pair of a nut and screw which is to move linearly is coupled to the member of the alternate pair which is to move linearly so that they move linearly together. The members of the pairs of the nuts and screws which are not to move linearly are linearly constrained.

A particular form of the present invention contemplates a source of rotary power, such as an electric motor, which constantly drives a pair of axially constrained, recirculating ball nuts in rotation. In the turnbuckle analogy, the ball nuts correspond to the threads in the frame of the turnbuckle. Each recirculating ball nut is threaded onto a screw and both screws are axially coupled together for reciprocation together. The screws are oppositely threaded. Alternate braking of each screw while the other screw is unbraked provides relative rotational motion between the braked nut and screw. Because the nuts are axially constrained relative to the screws, in the analog by the frame, and the screws are coupled by tie rod members, a braked screw will move linearly with respect to its driving nut causing the unbraked screw to translate in the same fashion. At the end of a stroke, the braked screw is unbraked and the alternate screw is braked to obtain a power stroke in the opposite axial direction.

In the presently preferred form of the invention, a pair of spaced-apart recirculating ball nuts are coaxially aligned and axially fixed in position between a pair of thrust bearings secured in spaced-apart and stationary medial plates. The recirculating ball nuts are rotationally coupled together as through a sleeve, which sleeve is driven in unidirection rotation by a source of rotary power. A first screw is threadably received by a first of the recirculating ball nuts, and a second oppositely threaded screw is threadably received in the second of the recirculating ball nuts. These screws extend outward through clearance holes in the thrust bearings and medial plates and are coaxially disposed with respect to each other. A selectively activatable brake for each of the screws is coupled to its screw to arrest rotation thereof with respect to the screw's recirculating ball nut. Typically, the brakes may be mounted on pilot plates carried by the screws at their outer ends. The pilot plates are tied together in a convenient fashion, as through tie rods. The brakes are prevented from rotating with the screws through any convenient means such as a stationary shaft or guide rods extending through holes in the pilot plates in a manner to permit axial but not rotational movement of the pilot plates.

In the presently preferred embodiment of the present invention, when the brakes are off, the screws are free to turn with the recirculating ball nuts. Because both the nuts and the screws are rotating in the same direction and at the same rate, there is no relative motion between them. Thus no linear driving force is produced. If, however, either brake is applied it will stop rotation of its associated screw and produce a linear drive force in one direction toward the rotating screw side. At the end of its desired travel or stroke, means such as a limit switch may be tripped to activate the opposite brake on the other screw and deactivate the brake on the first screw. The first screw can now turn freely with its recirculating ball nut but the second screw is stopped with respect to its recirculating ball nut. Because the screws are oppositely threaded, there will be a linear motion of opposite direction from the first one described. At the end of the travel of the second screw the same limit switch may be activated to initiate a new cycle; alternately a second limit switch may be tripped to activate the opposite brake.

When one screw is stopped to produce linear motion with respect to its driving recirculating ball nut, the other screw must rotate at twice the drive speed to permit this motion by virtue of the coupling of the screws together for reciprocation together. This is easily accomplished with very high efficiency by using the recirculating ball nuts and screws. The kinetic energy is transmitted from the side of the activated brake to the side of the free brake and screw through the connecting tie rods and drive coupling. This energy along with that of the prime mover is turned into rotational force on the free screw with high efficiency. The ball-bearing screw typically converts mechanical rotary motion to linear motion with an efficiency of 90 percent.

These and other features, aspects and advantages of the present invention will become more apparent from the following description, appended claims and drawings.

BRIEF DESCRIPTION OF THE FIGURES

FIG. 3 is an end view of the drive of FIG. 2;

DESCRIPTION OF THE PREFERRED EMBODIMENTS

Figure 1:
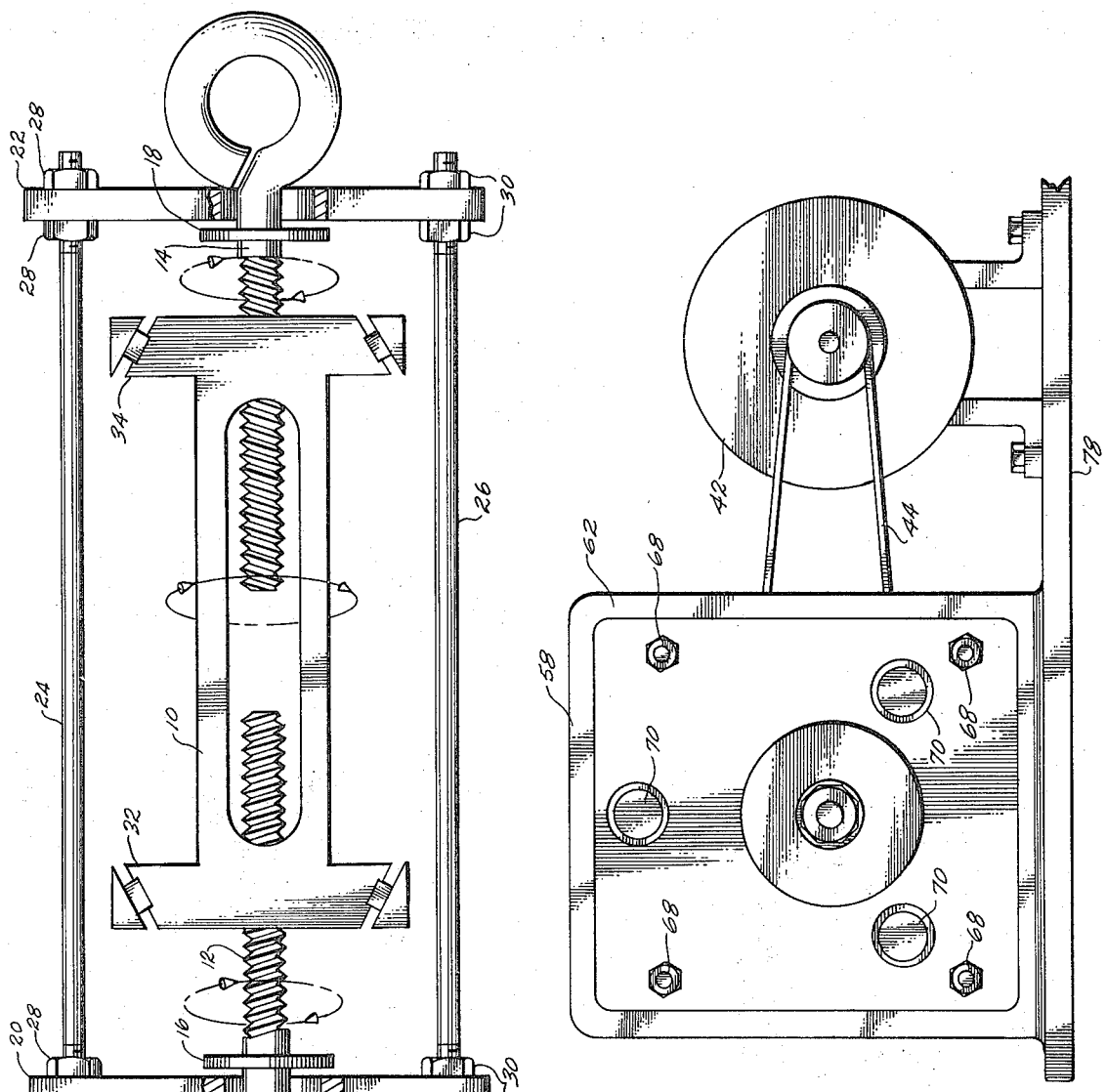
FIG. 1 is a side elevational, simplified view of a drive in accordance with the present invention which is presented for purposes of illustrating the principles of the present invention.

FIG. 1 illustrates in general a "turnbuckle" device which illustrates the principles of the present invention and which is the analog of the preferred embodiment of the present invention.

In the Figure a frame 10 receives in threads a pair of oppositely threaded screws 12 and 14. The frame and the screws constitute the familiar turnbuckle. If the frame is driven in rotation by a rotary prime mover, it will drive both screws with it. If the rotation of one of the screws is stopped, as by a brake, while the frame is being driven, the screw which is stopped will move linearly with respect to the frame and the other screw. If the screws are coupled together for linear movement together, stopping the rotation of one screw produces linear movement of both screws provided that the mechanical efficiency of each screw nut combination is of the order of 50%. If, in addition, means are provided to overcome the inefficiency of the classic Acme screw threads (common to the turnbuckle), efficient and practical linear movement from unidirection rotational motion results. Finally, with alternate braking of the screws, efficient reciprocation takes place. Under these circumstances the prime mover operates at or near its design speed, which is most efficient and the brakes operate with minimum drag, which is their most efficient mode of operation. These features coupled with the use of the efficient ball-bearing screw make for a practical turnbuckle drive to produce linear reciprocating motion.

The means for coupling the turnbuckle of screws 12 and 14 and their joining frame 10 are the other items shown in FIG. 1. Each screw is coupled to the other for simultaneous translation while permitting the screws free rotation when not braked. For this purpose, screw 12 has a washer-like member 16 affixed to it and screw 14 has a similar washer-like member 18 affixed to it. Between curled ends of screws 12 and 14 and washer members 16 and 18 are plates 20 and 22, respectively. The plates are parallel to each other and at right angles to the line of reciprocation of the screws. Tie rods 24 and 26 are secured to the plates by nut sets 28 and 30 to complete the translational coupling of the screws. The ends of frame 10 are firmly constrained against translation as through thrust bearings 32 and 34 secured to a stationary base, which has been omitted from the Figure. The screw and frame threads are replaced by low friction "threads" shown explicitly in the preferred embodiment which will be described subsequently.

By rotating the frame as before, both screws will assume a similar speed and direction of rotation. The drive can be said to idle at a constant speed. If one of the screws is stopped by the application of an external brake it will move outwardly (with the threads and rotational sense shown in the Figure obtaining). Since it is coupled to one of the plates in this movement, the plate moves in association with the screw. Because both plates are attached by means of the tie rods, the movement of one plate causes the second plate to follow in direction and at the speed of the first plate. In this manner, the special relationship of both screws is always maintained. The spacing between the screw ends in frame 10 is dynamically fixed.

With reference now to the preferred embodiments of FIGS. 2 through 6, a turnbuckle drive 40 is illustrated. The drive includes a prime mover to supply rotary power, shown here as an electric motor 42. The motor, through a belt 44, drives a sleeve 46 continuously at a constant rotational speed in one direction of rotation. A first recirculating ball nut 48 is keyed to the sleeve for rotation with it. A first screw 50 is engaged by recirculating ball nut 48. A second recirculating ball nut 52 is also keyed to sleeve 46 for rotation therewith. A second screw 54 is engaged by the second recirculating ball nut. The two screws are oppositely threaded to produce reciprocation from a source of unidirectional rotary power. Each of the ball nuts is restrained against movement in a direction along the axes of the screws by medial plates 56 and 58. Pilot plates 60 and 62 are carried for reciprocation by screws 50 and 54, respectively. Each of the pilot plates mounts a brake, indicated by reference numerals 64 and 66 for pilot plates 60 and 62, respectively.

Figure 2:
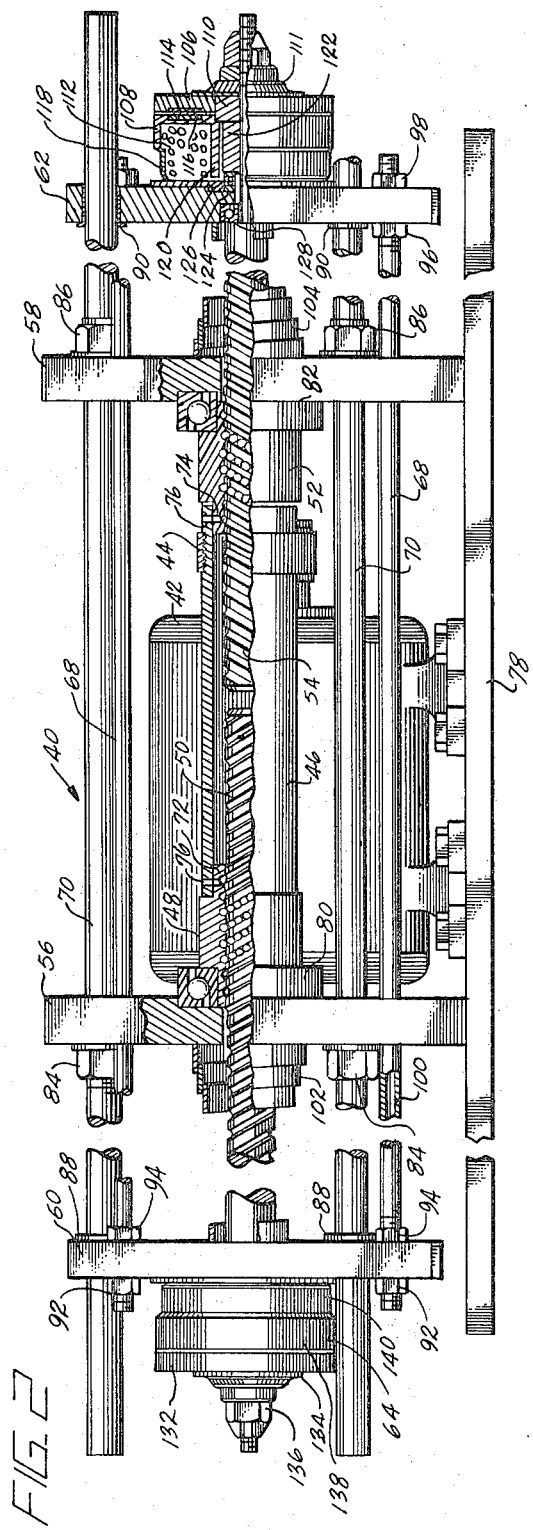
FIG. 2 is a side elevational view of the preferred form of the drive of the present invention, with portions of the drive broken away in half section for purposes of illustration.
Figure 4:
FIG. 4 is a schematic of the drive shown in FIGS. 2 and 3 to illustrate the appearance of the drive in one limit of its reciprocation.

The pilot plates are coupled together for reciprocation by tie rods, shown at 68 in FIGS. 2 and 3. Any moments on the pilot plates about the common axis of screws 50 and 54 which would tend to cause pilot plate rotation is prevented by any convenient means such as longitudinal guide rods 70. The guide rods are continuous and are secured in medial plates. They pass through the pilot plates and serve to prevent rotation thereof while at the same time providing a sliding surface. It is preferred to provide sufficient guide shafts, say three, to resist any twisting of the pilot plates about the common axis of screws 50 and 54.

In general, the drive works as follows. Suppose pilot plate 60 is proximate medial plate 56 at the inner end of its stroke and pilot plate 62 is remote from medial plate 58 (see FIG. 5). Activation of brake 66 locks screw 54 against rotation with respect to its driving nut 52. At the same time brake 64 is inactive, leaving screw 50 free to rotate with its driving nut 48. With rotation of nut 52, by virtue of the rotation of its driving sleeve 46 and ultimately the rotary prime mover 42, screw 54 traverses linearly to the left in FIG. 2. At the same time, screw 50 also traverses linearly to the left because pilot plate 60 is coupled to pilot plate 62 of screw 54 through tie rods 68. At the end of its stroke the brake of screw 54 is inactivated and the brake of screw 50 is activated. This produces linear motion of the two screws to the right in FIG. 2.

With this brief description a more detailed description of the preferred embodiment of the present invention will now be presented.

Sleeve 46 is driven in rotation by a means such as pulley belt 44. Recirculating ball nut 48 has an axially extending, annular shoulder 72 facing the center of the drive. Similarly, recirculating ball nut 52 also has an axially extending, annular shoulder 74 which faces the center of the drive. Sleeve 46 is secured to recirculating ball nuts 48 and 52 at the shoulders of the nuts as through dowels 76.

Medial plates 56 and 58 extend vertically from a base 78 and are fixed thereto so that the medial plates are stationary with the base. A thrust bearing 80 is provided between recirculating ball nut 48 and medial plate 56 to reduce friction between the rotating, recirculating ball nut and the stationary medial plate and for the efficient transfer of axial loads from the sleeve to medial plate. A similar thrust bearing 82 is disposed between medial plate 58 and recirculating ball nut 52 for the same purpose.

Recirculating ball nuts 48 and 52 and screws 50 and 54 provide a highly efficient means of converting unidirectional rotary motion to linear reciprocation. That is, friction losses are low through the operation of the recirculating ball nuts and screws of the drive of the present invention.

Recirculating ball nuts and screw are well known devices for producing very low friction between the threads of a nut and the threads of a screw. With the low friction there is the capability of a highly efficient drive of the nut or the screw by the other. Obviously, other low friction devices may be used to drive a nut or a screw by rotation of one with respect to the other. Needle bearings mounted in a nut to track in the threads of a screw is one example. Tapered rollers acting on the faces of the screw threads and mounted in the nut is another example. Even a threadless-roller screw is a practical means to achieve the turnbuckle drive function. Here parallel rollers or a linear ball bushing are used in lieu of the ball-bearing nut in conjunction with a straight ungrooved or unthreaded shaft. The parallel rollers or circuits for linear ball bushing are oriented in a spiral so as to provide the required screw pitch. Whatever means are used to provide a low friction coupling between a nut and a screw, a low friction coupling is fundamental to the drive of the present invention for it provides high efficiency in converting rotary power to linear motion.

Continuing with the description, guide rods 70, which prevent rotation of pilot plates 60 and 62, are secured as through fastener sets 84 and 86 to medial plates 56 and 58, respectively. The shafts extend through low friction linear bearings 88 and 90 in pilot plates 60 and 62, respectively. A sufficient number of guide rods are provided to resist angular displacement of the pilot plates when brakes 64 and 66 are applied.

As previously mentioned, each of the pilot plates is coupled to the other for reciprocal motion together. This is effected through a plurality of tie rods shown in FIGS. 2 and 3 at 68. Tie rods 68 are each threaded and secured to pilot plate 60 as through nuts 92 and 94 on the threads. They are secured to pilot plate 62 as through nuts 96 and 98 on threads of the tie rods.

The power stroke of the drive of the present invention may be either inward towards the center of the drive or outward from the center of the drive. That is, the translating pair of screws may effect a work force to the right or left so long as the net effect on the tie rods 68 causes them to move in tension. When loaded in tension each tie rod may be made very narrow and light. Indeed, hollow tubes are quite satisfactory as indicated at 100 in FIG. 2, which shows a portion of the illustrated tie rod in section. Since many materials have high tensile strength, the use of the tie rod in this way affords complementary advantage.

Dust covers 102 and 104 may be used to protect the threads of screws 50 and 54. A number of forms of dust cover may be used but the ones illustrated resemble coil springs axially extended and secured by the medial plate and the pilot plate on each side.

Brake 66, the right end brake illustrated in FIG. 2, has an armature 106 which is capable of longitudinal, axial movement toward and away from a stator 108. Armature 106 is mounted on an armature carrier 110 through an annular spring 111. The spring biases the armature away from the stator, but articulates with the attraction of the armature towards the stator by an electromagnetic force of a coil 112. The engaging faces of the armature and the stator are shown at reference numerals 114 and 116, respectively. If desired, a suitable friction coating and long wearing material may be used to augment the braking action and extend the life of the brake at these friction surfaces. Stator 108 has an annular, axially extending, outer shell 118 which encompasses the radial exterior of coil 112. The stator also has an annular, axially extending, interior shell 120 around which the annular coil extends. An interior annular spacer 122 is received on a reduced diameter section of screw 54 and provides bearing for armature carrier 110. A needle bearing 124 between spacer 122 and pilot plate 62 provides for a low friction axial coupling of the two, while permitting the rotation of the spacer with the screw. A spacer ring 126 circumscribes and locates the needle bearing concentric with the axis of screw 54.

A thrust bearing 128 is provided between a radial shoulder of screw 54 and pilot plate 62 for low friction rotational coupling of the screw with the pilot plate. A castellated nut 130 secured on threads to the end of screw 54 secures the brake armature assembly to the screw and to the pilot plate. The brake stator is attached to the pilot plate with fasteners.

Brake 64 for the left side of the drive shown in FIG. 2 is identical in construction to brake 66, just described. As such, its description will be limited. The brake has an armature 132 mounted through a spring to an armature carrier 134, which in turn is held in place by a castellated nut 136. An interior spacer, not illustrated, provides axial bearing for the interior end of the armature carrier. Castellated nut 136, secured to threads of screw 50, anchors the armature assembly. A stator assembly 138 and a coil housing 140 provide the balance of the visible portion of the illustrated brake.

Figure 6:
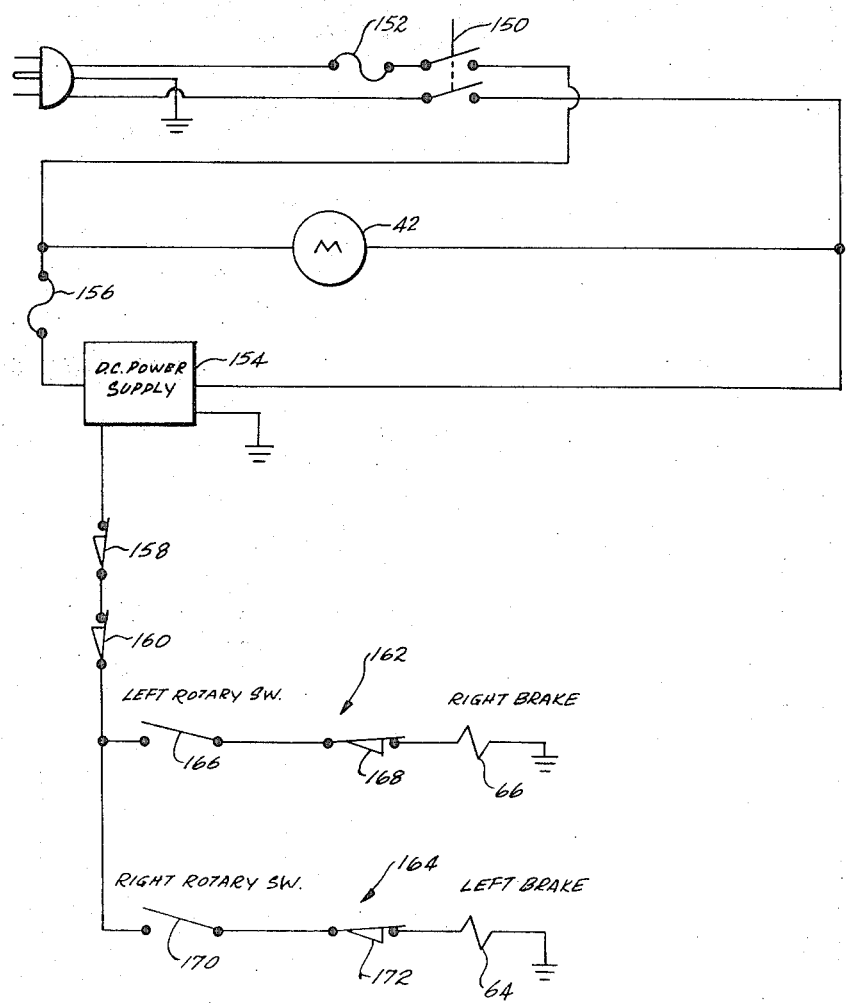
FIG. 6 is a circuit diagram illustrating a means for effecting the alternate braking of the screws of the present invention to obtain the reciprocating motion.

An appropriate circuit for effecting alternate activation of brakes 64 and 66 at the initiation of their power strokes at the inner end of their cycles is illustrated in FIG. 6.

Motor 42 is in series circuit with a source of alternating current through an on-off switch 150 and a circuit protecting fuse 152. In parallel with the motor, a DC power supply 154 is in series circuit with the source of alternating current and is itself protected by a fuse 156. The output from DC power supply 154 is wired through a pair of overtravel limit switches 158 and 160. Limit switch 158 may correspond to an overtravel switch for the left side of the drive and will open a circuit to the two brakes 64 and 66 in the event that pilot plate 60 travels beyond a predetermined point. Limit switch 160 provides the corresponding function for the right side of the drive and thus senses overtravel of pilot plate 62 to terminate the circuit to the brakes. In series with the overtravel limit switches and between the overtravel limit switches and ground are two parallel branch circuits 162 and 164 for right and left brakes 64 and 66, respectively.

Figure 5:
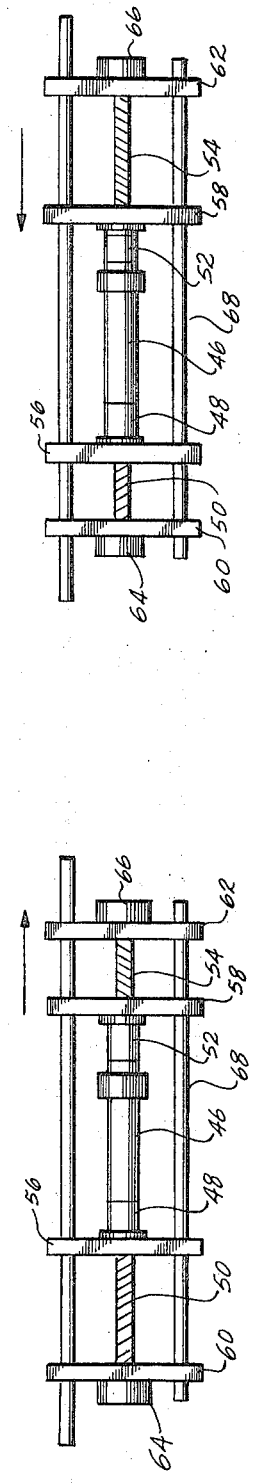
FIG. 5 is a view similar to FIG. 4 except that it shows the other limit of reciprocation of the drive.

Branch circuit 162 includes a left rotary switch 166 which is mounted on left screw 50 to close upon sensing rotation of the screw. The rotary switch is in series circuit with a limit switch 168, which is normally closed, and which opens in response to pilot plate 60 reaching its innermost position (FIG. 5). Right brake 66 is shown schematically. Thus when screw 50 rotates, switch 166 closes to energize right brake 66 and prevent screw 54 from rotating with respect to nut 52. Screw 54 will then travel linearly to the left in FIG. 2 until limit switch 168 opens, whereupon the right brake is dropped out of circuit and screw 54 is freed from nut 52.

Branch 164 is similar to branch 162. It has a right rotary switch 170 mounted on screw 54 to sense the latter's rotation and to close upon sensing its rotation. A limit switch 172 is responsive to the innermost position of pilot plate 62 to open, but is otherwise closed. The left brake is indicated schematically. Thus when the drive is to the left in FIG. 2, as just described, and limit switch 168 is open, the right brake is released and consequently screw 54 will begin to rotate. Rotation of screw 54 will close right rotary switch 170 to energize brake 64 and cause the drive to reciprocate to the right in FIG. 2.

Figure 7:
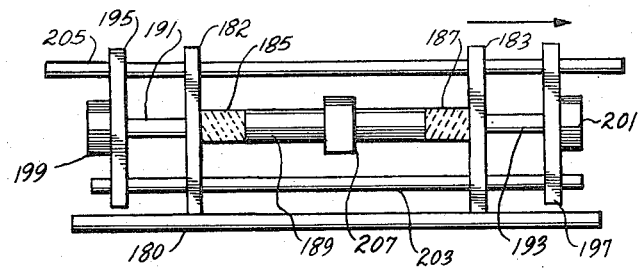
FIG. 7 is a view illustrating an alternate embodiment of the present invention.

FIG. 7 illustrates schematically an application of the principles of the present invention to a drive which can serve effectively, for example, as a micro manipulator. Because the drive illustrated in FIG. 7 is essentially identical to that described in the first six Figures, except for one aspect, the illustration and description are abbreviated. In the Figure, a base 180 provides the mounting for a pair of spaced-apart and parallel medial plates 182 and 183. A pair of linear bushings 185 and 187 are secured to a drive sleeve 189 and are confined axially between the medial plates by the thrust bearings (not shown). The linear bushings have a plurality of rollers, or recirculating balls, or the like oriented in parallel rows but on a bias to the axis of the bushings and a plane perpendicular to the axis of the bushings. The bias produces a spiral effect which is analogous to the screw pitch in the previously described embodiment. Received by bushing 185 is a threadless shaft 191 and received by bushing 187 is a threadless shaft 193. The rollers or balls of the respective bushings act on the shaft in a manner quite similar to the action of the balls of the recirculating nuts in the threads of the screws of the previously described embodiment.

To complete the description of the drive of FIG. 7, a pilot plate 195 is secured to shaft 191. Similarly, a pilot plate 197 is secured to shaft 193. A brake 199 is activatable to stop rotation of shaft 191 and a brake 201 is activatable to stop the rotation of shaft 193. The pilot plates and thus the shafts are translationally coupled together through tie rods 203. To resist twisting of the pilot plates, guide rods 205 secured to medial plates 182 and 183 receive the pilot plates for the latters' translation in a manner identical to that described with reference to the previously described embodiment. A rotary drive (not shown) through a belt 207 drives the linear bushings in rotation.

The drive of FIG. 7 has the advantage that a threadless screw can be used which results in economies and simplified maintenance. Linear bushings having rollers or recirculating ball circuits oriented to produce a spiral effect are commercially available.

The operation of the drive of the present invention has been described along with the description of the drive structure but will be briefly presented again now.

Motor 42 drives sleeve 46 in rotation in one direction. The sleeve in turn drives recirculating ball nuts 48 and 52 in the same direction. The ball nuts are confined against any axial movement with respect to screws 50 and 54. Suppose the condition illustrated in FIG. 4 exists with screw 54 at its inner position and screw 50 at its outer position. In the FIG. 4 orientation, screw 50 is about to translate with screw 54 to the right (direction of arrow). Consequently, brake 64 is activated to capture screw 50 and brake 66 is inactivated to free screw 54 for rotation. Screw 50 cannot rotate with respect to its driving, recirculating ball nut 48. As a consequence, screw 54 will travel linearly to the right in FIG. 4 as will screw 50 because of the connection through tie rods 68 and pilot plates 60 and 62. At the end of the stroke to the right the drive appears as shown in FIG. 5. This time the activation sequence of the brakes is reversed to free screw 50 for rotation and to prevent rotation of screw 54 with respect to recirculating ball nut 52. Screws 50 and 54 will move linearly to the left, by virtue of tie rods 68 and the pilot plates.

As previously mentioned, in translation the free screw, that is the screw without an activated brake, will rotate at twice the speed of the rotary drive.

The operation of the FIG. 7 embodiment is essentially identical to that previously described. Thus the activation of brake 199 will stop the rotation of shaft 191 to cause both shafts to translate because they are coupled together. The activation of brake 201 will cause shaft 193 to stop rotating to cause translation of both shafts in the opposite direction.

The present invention has been described with reference to a certain preferred embodiment. The spirit and scope of the appended claims should not, however, necessarily be limited to the foregoing description.

What is claimed is:

1. An improved reciprocating drive comprising:
   a. a first nut and a first screw, with the first nut being threadably received on the first screw and one of them constituting a drive member and the other of them the driven member;
   b. a second nut and a second screw oppositely threaded from the first nut and first screw, with the second nut being threadably received on the second screw and with one of them being a drive member and the other of them the driven member;
   c. first and second low friction bearing means between the threads of the nuts and screws of the first and second nuts and screws, respectively;
   d. means coupling the drive members together against linear movement of one of the members with respect to the other;
   e. means coupling the driven members together against linear movement of one with respect to the other;
   f. selectively activatable brake means for the first driven member;
   g. selectively activatable brake means for the second driven member;
   h. means to activate only one of the brakes at a time to produce reciprocation of the driven members; and
   i. means to rotate the drive members.

2. The improved reciprocating drive claimed in claim 1 wherein the first nut and the second nut are the drive members and the first screw and the second screw are the driven members.

3. The improved reciprocating drive claimed in claim 2 wherein the low friction means between the threads of the first and second nuts and screws comprises recirculating balls.

4. The improved reciprocating drive claimed in claim 2 wherein the first screw and the second screw are tandemly aligned.

5. An improved reciprocating drive comprising:
   a. a base;
   b. a first screw and a first recirculating ball nut, with the first recirculating ball nut being threadably received on the first screw;
   c. a second screw and a second recirculating ball nut, with the second recirculating ball nut being threadably received on the second screw, the second screw and nut being threaded oppositely from the first screw and nut and being axially aligned therewith;
   d. means securing the first and second recirculating ball nuts to the base against translation with respect thereto while permitting rotation of the recirculating ball nuts with respect to the base;
   e. means securing the first and second screws together for reciprocation together;
   f. selectively activatable brake means for the first screw to prevent rotation thereof with respect to the base;
   g. selectively activatable brake means for the second screw to prevent rotation thereof with respect to the base;
   h. means to rotate the recirculating ball nuts in one direction of rotation; and
   i. means to activate one of the brakes at a time and in alternate fashion to produce reciprocal motion of the screws.

6. The improved reciprocating drive claimed in claim 5 wherein:
   a. the means for securing the screws together for reciprocation together includes at least one tie rod; and
   b. the means to activate one of the brakes at a time is operable to activate the brakes at an outer point in the reciprocal movement of each of the screws.

7. The improved reciprocating drive claimed in claim 5 wherein:
   a. the recirculating ball nuts are mounted between a pair of spaced-apart medial plates with each medial plate being secured to the base; and
   b. the medial plates constituting the means for preventing the translation of the recirculating nuts.

8. The improved reciprocating drive claimed in claim 7 including:
   a. a first and a second pilot plate for the first and second screws, respectively, the first and second pilot plates mounting the first and second brake means, respectively, and being secured to the first and second screws, respectively; and
   b. at least one guide shaft extending parallel to the axes of the screws and secured to the medial plates, the pilot plates slidably receiving the guide shaft such that the guide shaft prevents rotation of the pilot plates.

9. The improved reciprocating drive claimed in claim 8 wherein:
   a. the means for securing the screws together for reciprocation together includes at least one tie rod secured to and extending between the pilot plates; and
   b. the means to activate one of the brakes at a time is operable to activate the brakes at an outer point in the reciprocal movement of each of the screws relative to the center of reciprocation.

10. The improved reciprocating drive claimed in claim 9 wherein the recirculating ball nut rotation means includes a sleeve secured to each of the nuts, and means to rotate the sleeve.

* * * * *